May 31, 1949.   R. E. HEALD   2,472,014
COMBUSTION SYSTEM FOR TURBINE ENGINES
Filed Aug. 2, 1944   8 Sheets-Sheet 1

INVENTOR.
RAYMOND E. HEALD
BY
Hood & Hahn
ATTORNEYS.

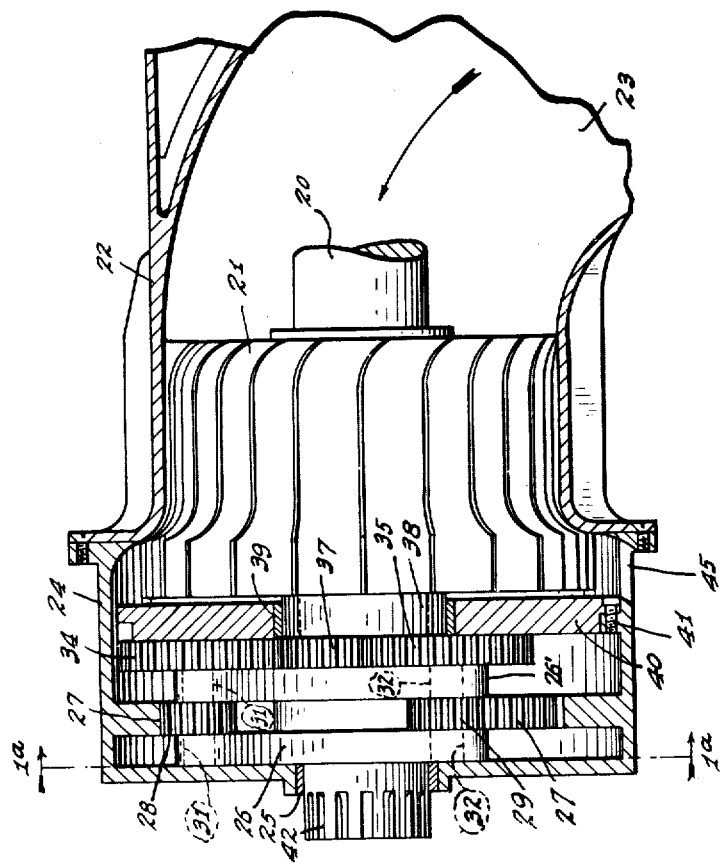

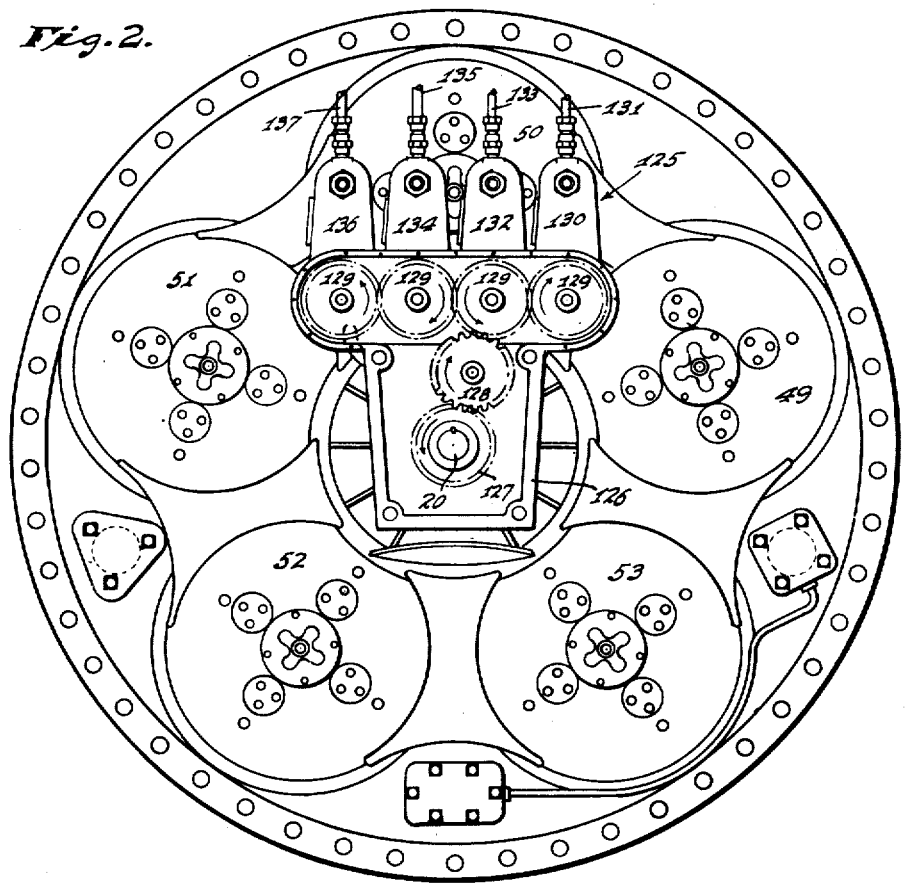

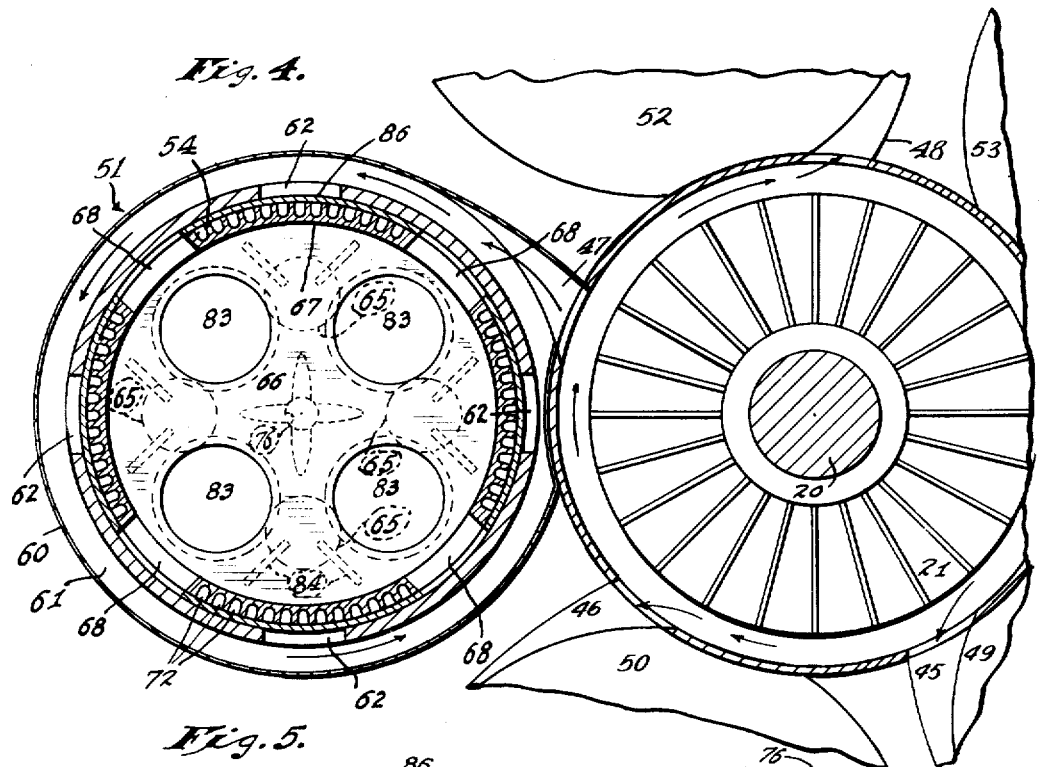
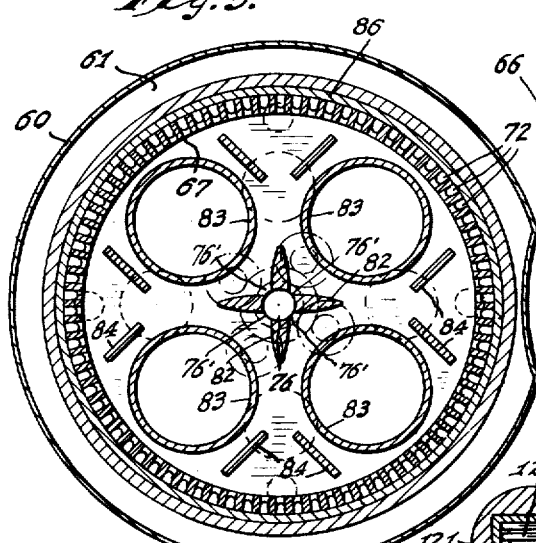
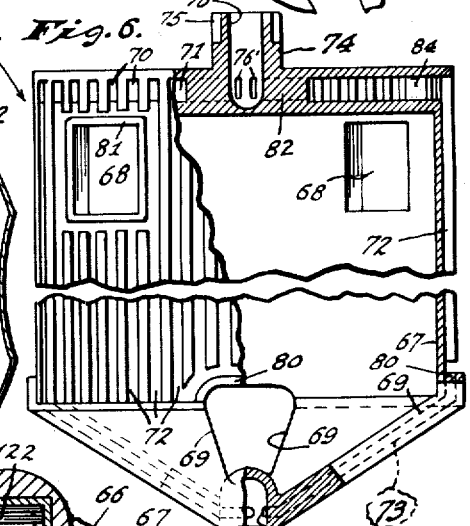
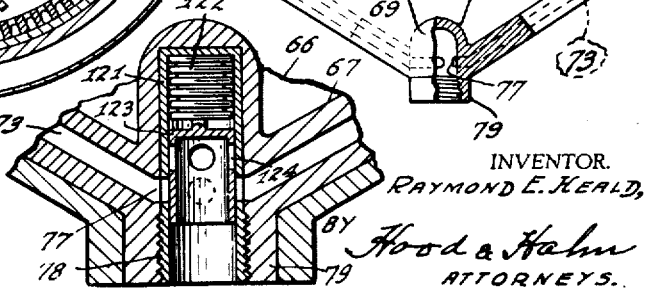

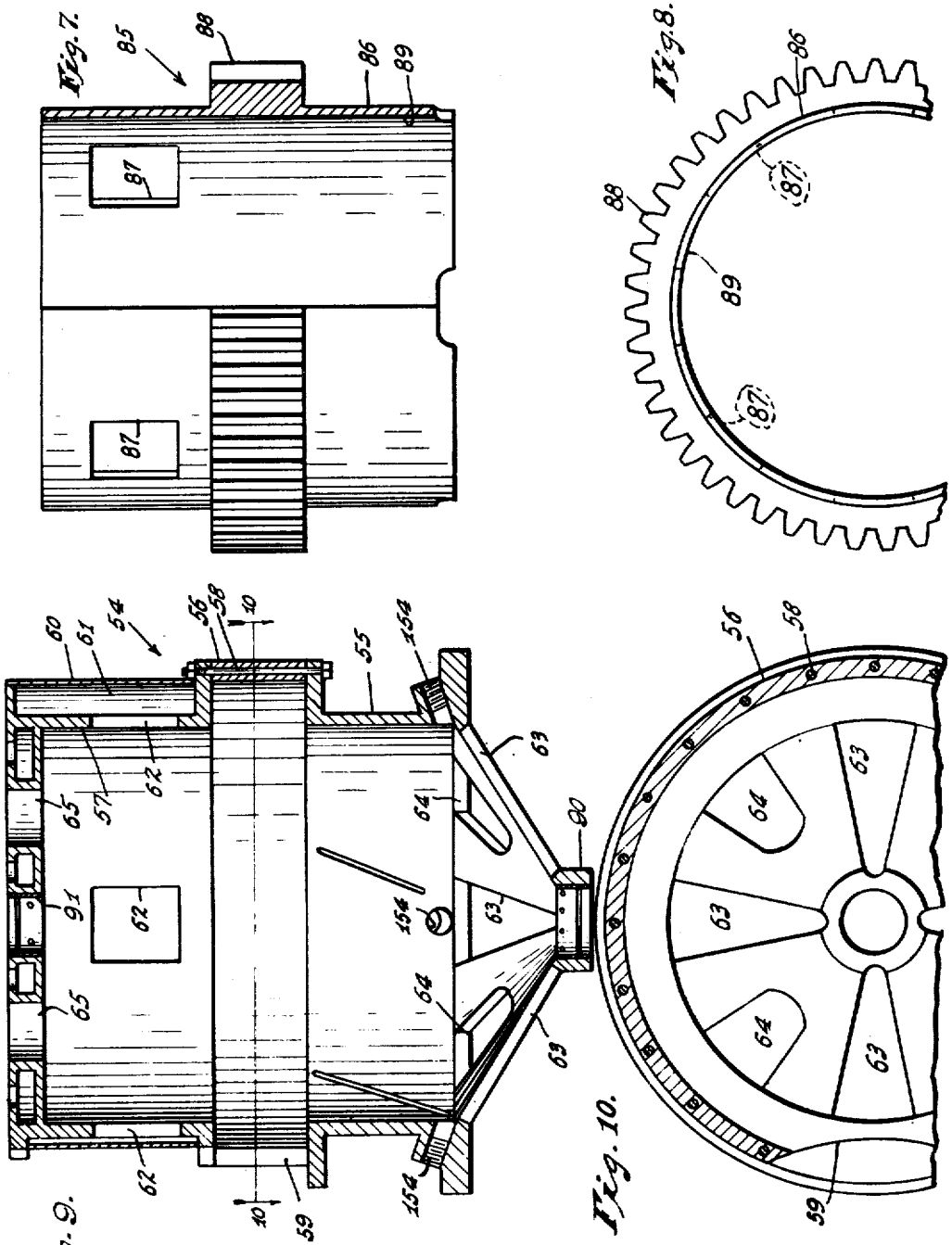

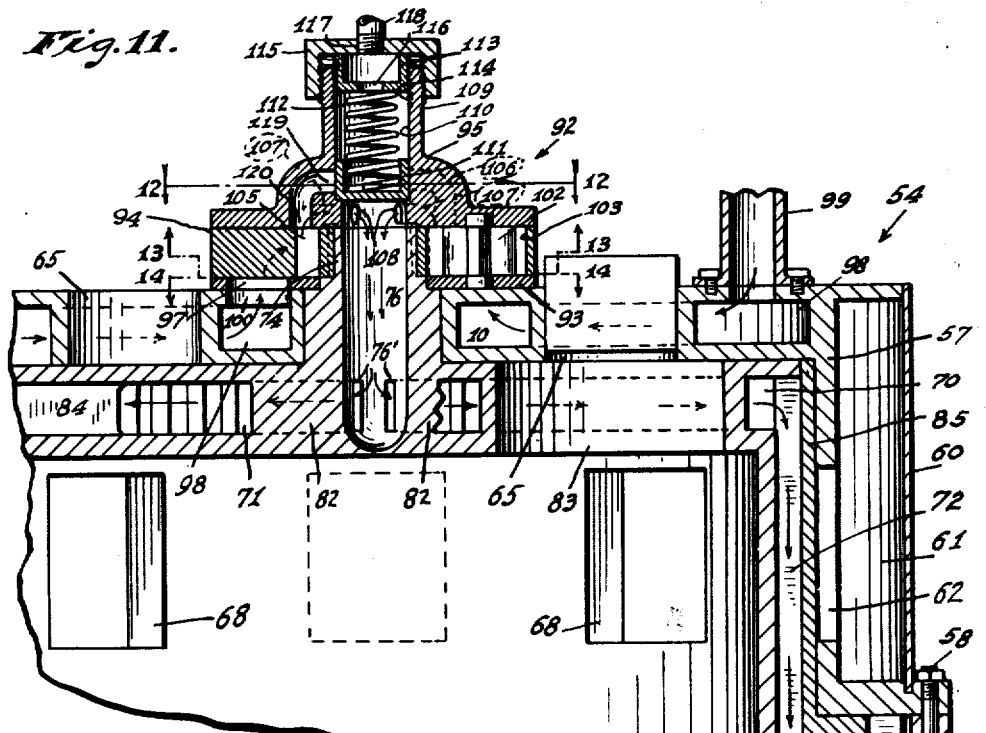
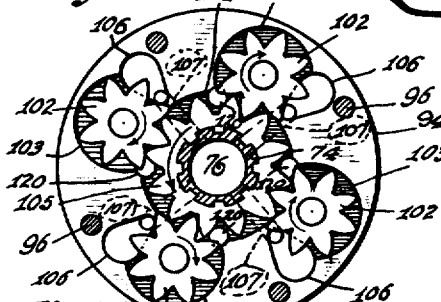
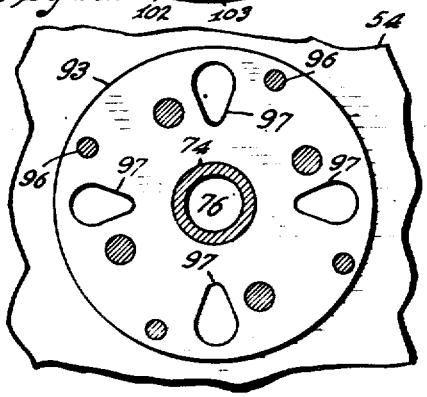
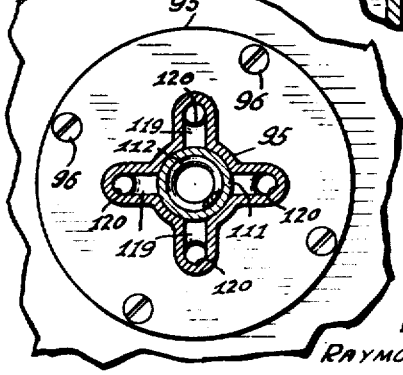

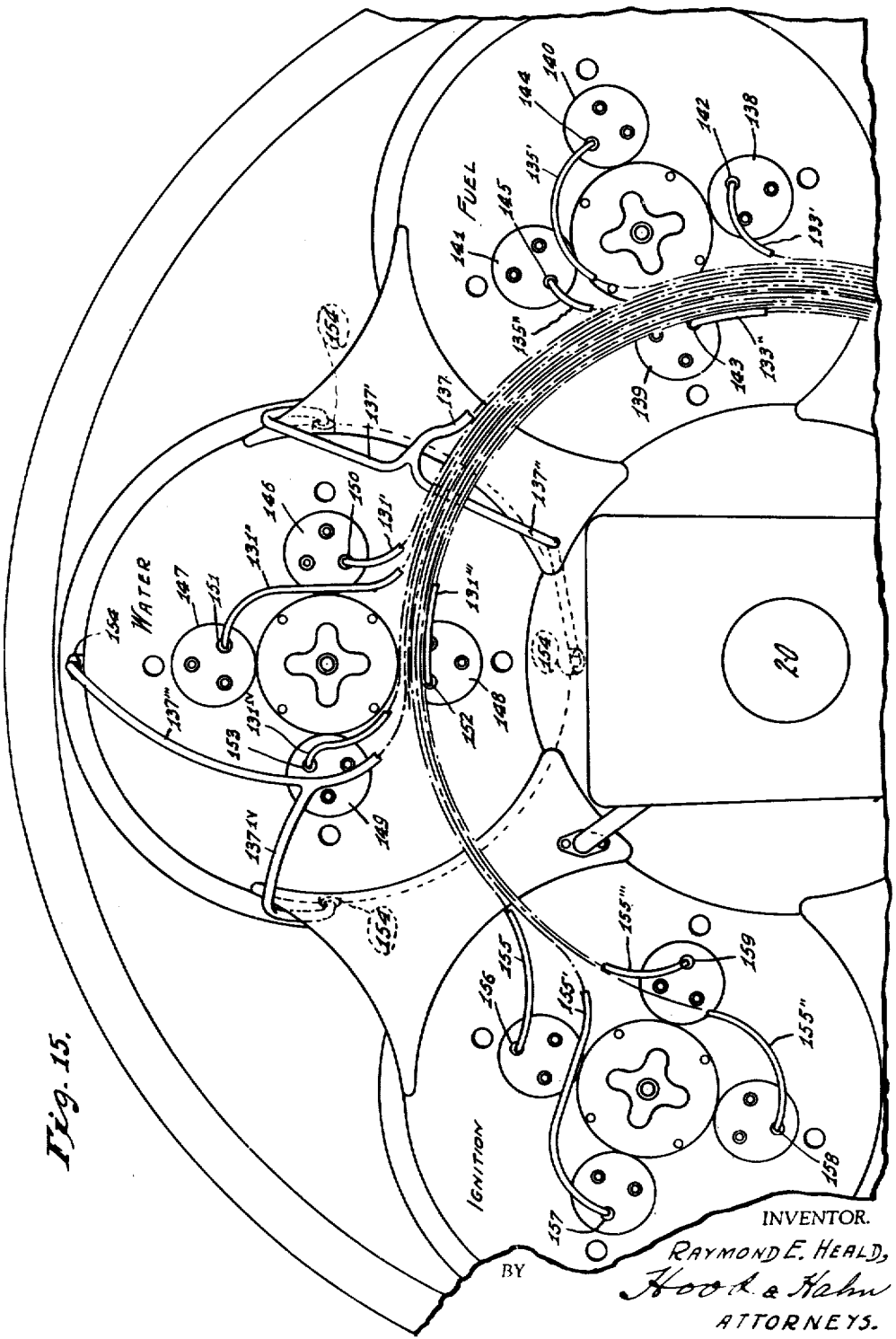

Patented May 31, 1949

2,472,014

UNITED STATES PATENT OFFICE 2,472,014

COMBUSTION SYSTEM FOR TURBINE ENGINES

Raymond E. Heald, Plainfield, Ind.

Application August 2, 1944, Serial No. 547,796

18 Claims. (Cl. 60—44)

The present invention relates to a combustion system for turbine engines. The primary object of the invention is to provide means for supplying fluid under pressure to drive a turbine. To that end, I have provided an internal combustion system whereby suitable fuel may be burned in combustion chambers, the gaseous products of combustion being suitably conducted to the turbine wheel in a substantially constant flow. The problem of controlling the temperature of the combustion chambers is solved by supplying a flow of coolant, a considerable portion of which may, at least at times, be vaporized either inside or outside the combustion chambers, or both, in which case the vaporized coolant may be added to the stream of fluid under pressure supplied to the turbine wheel.

According to the basic principle of this invention, air is forced into a combustion cell under sufficient pressure to scavenge therefrom the products of combustion resulting from a previous combustion cycle. A cluster of such cells is preferably used in the system, the cycles of the respective cells being so related to each other that gases under pressure are always flowing from at least one cell into suitable receivers or collectors. At proper intervals, fuel is injected into the cells and there burned, water being preferably injected also to reduce the temperatures within the cells and to be converted into steam to swell the volume and pressure of gases produced in the cells. During the period of combustion, and preferably for a short time thereafter, the expanding gases and vapors pass out of each cell through a high pressure receiver into, for instance, the high pressure end of a turbine. The gases subsequently scavenged from each cell by the air blast mentioned above are forced through a low pressure receiver whence they may flow into the low pressure side of the same turbine or into a second turbine operating at a lower pressure.

In a suitable water jacket surrounding each of the cells, steam is produced under sufficient pressure to add to the flow of vapor to the high pressure side of the turbine.

This alternating or intermittent cycle of combustion, and this production of steam to control temperature and to add to the power produced by the system are, I now believe, the predominating features of my invention, the particular means whereby they are effected being subject to some variation in detail.

The structure herein disclosed permits control of the temperature of the gases supplied to the turbine by the step of generating steam. Preferably, the dry gases scavenged from the combustion cells will be used to reheat the steam emerging from the primary turbine, and this mixture of scavenged gases and reheated steam can then be introduced into the secondary turbine. In the secondary turbine, the steam will be cooled to (substantially) the condensation point before it passes, with the exhaust gases, to suitable condensers.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1a is an enlarged transverse section taken substantially on the line 1a—1a of Fig. 1b;

Fig. 1b is an enlarged section of the blower drive shown in Fig. 1, the section being taken substantially on the line 1b—1b of Fig. 1a;

Fig. 2 is a top plan view of the system illustrated in Fig. 1;

Fig. 3 is a fragmental bottom plan view thereof, parts being broken away for clarity of illustration;

Fig. 4 is an enlarged horizontal section, taken on the line 4—4 of Fig. 1 and looking in the direction of the arrows;

Fig. 5 is a similar section taken substantially on the line 5—5 of Fig. 1 and looking in the direction of the arrows;

Fig. 6 is a broken elevation of the inner cell of a combustion chamber, parts being broken away for clarity of illustration;

Fig. 6a is an enlarged vertical section of valve mechanism for controlling coolant flow;

Fig. 7 is a broken elevation of a shell adapted to be associated with the inner cell of Fig. 6;

Fig. 8 is a bottom plan view of the shell of Fig. 7;

Fig. 9 is a transverse section through an outer cell forming a part of a combustion chamber;

Fig. 10 is a horizontal section taken substantially on the line 10—10 of Fig. 9;

Fig. 11 is an enlarged fragmental vertical section through the upper portion of a combustion chamber, showing the water pump and associated parts;

Fig. 12 is a horizontal section taken substantially on the line 12—12 of Fig. 11; and looking in the direction of the arrows;

Fig. 13 is a similar section taken substantially on the line 13—13 of Fig. 11 and looking upwardly;

Fig. 14 is a similar section taken substantially on the line 14—14 of Fig. 11 and looking downwardly;

Fig. 15 is an enlarged fragmentary view of a portion of the mechanism as illustrated in Fig. 2, and showing more or less diagrammatically the various supply lines for the combustion chambers.

Figure 1:
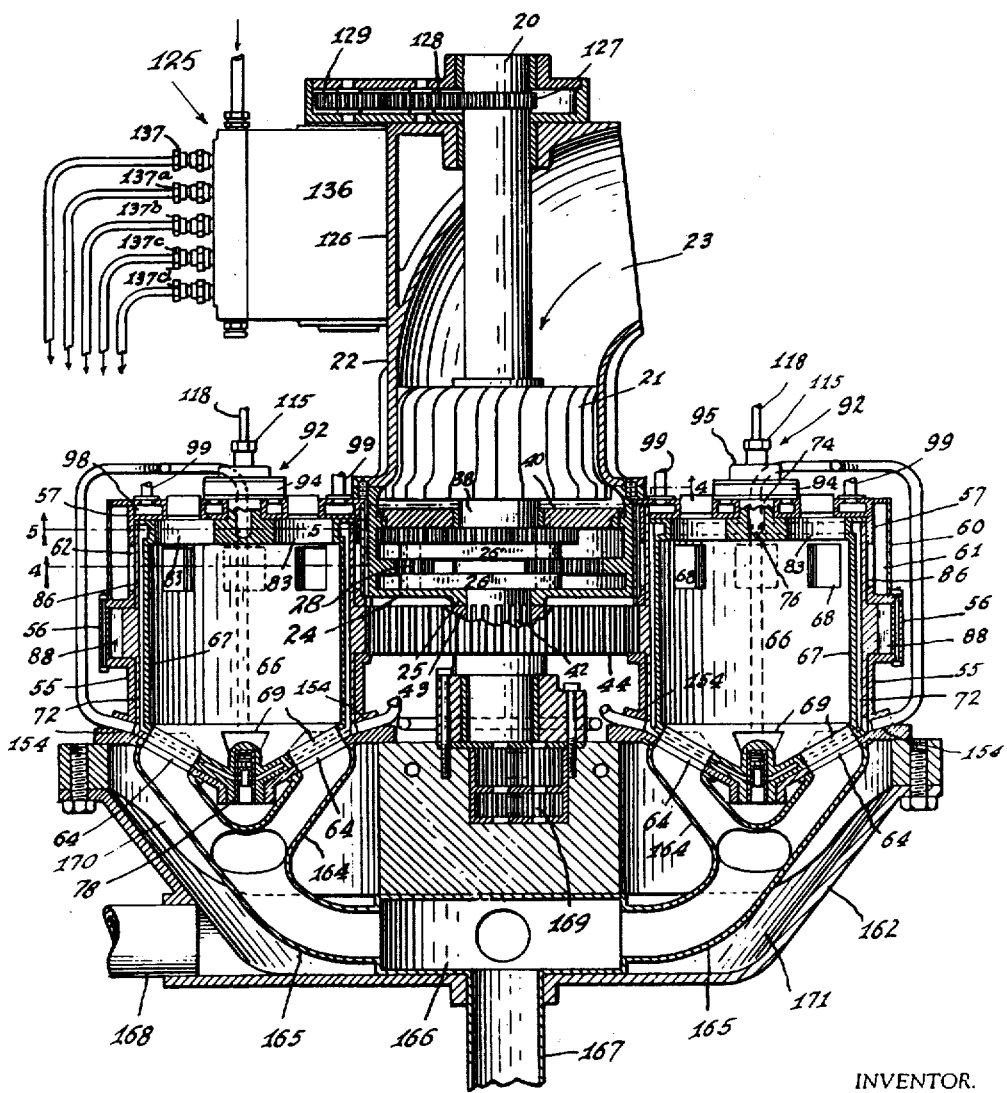
Fig. 1 is a vertical section through a combustion system constructed in accordance with my invention.

Referring more particularly to Figs. 1 and 1a, it will be seen that I have illustrated a shaft 20 upon which is loosely mounted a fan rotor 21 within a housing element 22 having an inlet port 23. Associated with the housing element 22 is a casing 24 formed, in its wall remote from the housing 22, to support a bearing 25 for an end of the shaft 20. Fixed to the shaft 20 within the casing 24 is a spider 26 having three arms and positioned beneath a ring gear 27 which is integral with, or fixed within, the casing 24. Each of the arms of the spider 26 mounts a shaft 31, 32, or 33. The shaft 31 carries a pinion 28, adapted to mesh with the ring gear 27, and the shafts 32 and 33 similarly carry pinions 29 and 30, likewise meshing with said ring gear 27. Fixed to the shaft 20 above the ring gear 27 is a similar spider 26' in the arms of which the shafts 31, 32, and 33 are supported; and above the spider 26', the shaft 31 carries a pinion 34; while the shafts 32 and 33 carry similar pinions 35 and 36. All of the pinions 34, 35, and 36 mesh with a gear 37 carried upon a collar 38 fixed to the fan rotor 21, and journalled in a bearing 39 carried in a closure plate 40 suitably secured in the upper end of the casing 24 by means of bolts 41 or other equivalent fastening means.

It will be clear that the above-described gear train will produce rotation of the rotor 21 at a speed in excess of the speed of the shaft 20.

The lower end of the shaft 20 projects beyond the bearing 25 and is splined as at 42 for the reception of the splined hub 43 of a gear 44, for a purpose later to be described. The fan is provided with a plurality of substantially tangentially arranged outlets (Fig. 4) 45, 46, 47, and 48 leading to the combustion units 49, 50, 51, and 52, as well as with a further outlet (not shown) leading to the unit 53 (see Fig. 2).

Each combustion unit consists of an outer cell and an inner cell, which inner cell includes a separately formed shell. The outer cell 54 (see Fig. 9) includes a base element 55, an intermediate element 56, and an upper element 57, secured together through the medium of bolts 58, or other equivalent fastening means. The intermediate element 56 is cut away at one side, as indicated at 59 in Fig. 10, for a purpose which will later be described. A shell 60 cooperates with the upper element 57 to form a chamber 61 with which communicate four ports 62 peripherally spaced 90 degrees from each other. The base element 55 includes a frusto-conical bottom which is formed with four large ports 63 spaced 90 degrees from each other and with four smaller ports 64 spaced 90 degrees from each other and 45 degrees from the ports 63. The otherwise closed upper end of the upper element 57 is formed with four port holes 65 for a purpose later to appear.

The inner cell 66 (Fig. 6) comprises a casting 67 formed in its side walls with four ports 68 adapted to register, at times, with the ports 62 of the outer cell 54. The frusto-conical base of the element 67 is formed with four ports 69, spaced 90 degrees from each other, and adapted to register, alternatively, with the ports 63 and 64 of the outer cell 54.

Adjacent its upper end, a large number of small ports 70 open into a hollow space 71, and communicate with grooves 72 axially arranged and extending to a level close to the base of the frusto-conical portion of the cell. Said frusto-conical portion of the cell is substantially hollow, providing a space 73 the upper end of which communicates, through bored holes, with the bases of the grooves 72, and the lower end of which communicates, through suitable ports 77, with a passage 78 leading out through the hub 79 at the bottom of the cell. A similar hub 74 at the top of the cell is splined as at 75 and is formed with an axial passage 76 communicating, through a plurality of ports 76', with the interior of the space 71.

Ribs 80 and 81 interrupt the grooves 72, extending into the level of the ridges between said grooves, to guard the ports 69 and 68.

The ports 76' are formed between reinforcing ribs 82. Short cylindrical conduits 83 are adapted to register, at times, with the port holes 65 of the outer cell, and communicate with the interior of the inner cell. Baffles 84 may preferably be positioned within the chamber 71 to assure even distribution of the liquid discharged through the ports 76', and flowing to and through the ports 70.

A shell 85 (Fig. 7) is adapted to be sleeved over the inner cell 66 and to cooperate with the ridges between the groves 72 and with the guards 80 and 81, to convert the grooves 72 into closed conduits adapted to conduct fluid from the ports 70 to the hollow chamber 73 formed in the bottom portion of the inner cell. The shell 85 comprises a cylindrical sleeve 86 provided with a plurality of ports 87 adapted to register precisely with the ports 68; and said sleeve is provided with a peripheral gear ring 88, which may be integral with said sleeve, or which may be fixedly secured thereto. The internal surface 89 of the sleeve 86 is designed to fit snugly upon the surfaces of the ridges defining the grooves 72, and of the guards 80 and 81; and after the sleeve 86 is assembled with the inner cell 66, it will be permanently secured thereto, as by shrinking, brazing, or perhaps welding, so that the conduits formed by the thus-closed grooves 72 will be steam tight.

The elements of the outer cell 54 being disassembled, the inner cell comprising the element 66 wearing its shell 85, is entered in the lower element 55 of the outer cell. The lower hub 79 of the inner cell, of course, will be journalled in the hub 90 of the outer cell, and the gear 88 will substantially rest upon the upper surface of the element 55. The elements 56 and 57 are now associated with the element 55, the gear 88 projecting outwardly through the cut away portion 59 of the element 56, and the hub 74 being journalled in the bearing 91 in the upper wall of the upper element 57 of the outer cell 54. Thus the inner cell is rotatably mounted within the outer cell.

A water pump, indicated generally by the reference numeral 92, is illustrated in detail in Figs. 11 to 14. The pump comprises a base plate 93 seated on the top surface of each outer cell 54, a body 94, and a cap or cover units 95, said units being secured together and to the cell 54 by means of a plurality of bolts 96, or other equivalent fastening means. The plate 93 is formed with four ports 97, peripherally spaced 90 degrees apart. The upper portion of the outer cell 54 is formed to provide a chamber 98 with which communicates a water supply line 99; and the ports 97 register with ports 100 leading into said chamber 98.

Journalled at their lower ends in the plate 93 are four pumping pinions 102, each mounted in a chamber 103 formed in the body 94, each of said chambers having communication with a central chamber 104 within which is rotatably mounted a pump gear 105 splined on the hub 74 of the inner cell. Each of the chambers 103 communicates with one of the ports 97 in the plate 93, and communicates also with a port 106 in the cap 95 communicating with a passage 107 in said cap, each of said passages 107 having a mouth 108 opening into a central chamber in the cap registering with the passage 76 formed in the associated inner cell hub 74.

Assuming rotation of the inner cell 66 in a clockwise direction as viewed from above, the gear 105 will be thereby carried in a counter clockwise direction as seen in Fig. 13 to produce clockwise rotation of the pinions 102, as seen in that figure. Such rotation of the pinions 102 will carry liquid from the ports 97 to the ports 106 and discharge the same through the passages 107 and ports 108 into the passage 76, whence such liquid can flow through the ports 76' into the chamber 71, thence through the ports 70 and grooves 72 to and through the passage 73 and into the passage 78 in the inner cell hub 79.

At times, as will appear hereinafter, it is desirable to prevent or retard flow in the above-described path. The cap 95 is formed with a neck 109 providing a vertical bore 110 in which is reciprocably mounted a piston valve 111. Under normal conditions, said valve occupies the position illustrated in Fig. 11, being held in that position by a spring 112 whose degree of compression is adjustable through the medium of a plug 113 adjustably threadedly mounted in the threaded portion 114 of the bore 110. A closure cap 115 seals the chamber or bore 110, but the plug 113 and closure cap 115 are provided with ports 116 and 117 providing communication with the interior of the bore 110. A conduit 118 (see Fig. 1) leads from a suitable point in the high pressure line and is connected in the port 117 of the cap 115, whereby the water pressure required to raise the valve 111 will exceed the currently-existing pressure in the high pressure supply line to the turbine by an amount measured by the current degree of compression of the spring 112.

When the valve 111 is lifted, it opens passages 119 whose mouths 120 communicate with the chambers 103, thereby providing a short circuit circulation for the pump mechanism.

Flow through the above-described normal circuit will be controlled primarily by the mechanism illustrated in Fig. 6a. The bore 78 in the hub 79 will preferably be internally threaded for the reception of a valve housing 121 in the upper end of which is fixed a bellows 122 of the type which is responsive to temperature variations. Said bellows carries a piston valve 123 formed with ports 124, the unit being so constructed that, when the bellows 122 is contracted, the ports 124 are out of registry with the chamber 73, whereby flow from said chamber to the hub bore 78 is prevented. It will be seen that the bellows 12 is so positioned as to be subjected to temperature conditions existing within the combustion cell. An increase in temperature tends to expand the bellows to shift the ports 124 into registry with the chamber 73 to permit flow through the above-described circuit. It is to be particularly noted that the valve construction is such that the bellows 122, while not affected by pressure conditions existing within the combustion cell, is nevertheless subject to the effect of pressure conditions existing within the bore 78 of the hub 79 of the cell. That is, pressure within that bore is applied directly to the lower end of the valve 123, thus tending to collapse the bellows 122, in opposition to the effect of high temperature upon the bellows.

An injector unit of substantially standard construction is indicated generally by the reference numeral 125 in Figs. 1 and 2. Said unit comprises four banks of pumps 130, 132, 134, and 136. Each pump bank is provided with five outlet pipes. In Fig. 1, the outlets 137, 137a, 137b, 137c, and 137d are illustrated. In Fig. 2, I have illustrated one outlet pipe 131 for the bank 130, one outlet pipe 133 for the bank 132, and one outlet pipe 135 for the bank 134, but it is to be understood that each of said banks 130, 132, and 134 is provided with five separate outlet pipes just as is the bank 136.

The injector unit 125 may be mounted upon a suitable bracket 126 at the upper end of the cell cluster. The gear 127 fixed to the shaft 20 (see Figs. 1 and 2) meshes with an idler 128 which meshes with one gear 129 of the injector unit 125. As is apparent from an inspection of Fig. 2, the particular gear 129 shown in mesh with the gear 128 drives the pump bank 132; but all of the gears 129 are in meshed relation, so that this arrangement produces a drive of the pumps of all four banks 130, 132, 134, and 136. The operation of the injector unit 125 need not be described in detail, since it is well understood in the art.

The various pipes leading from the injector unit may be enclosed in a suitable manifold or conduit, and will lead to the individual cells of the cluster in the fashion diagrammatically illustrated in Fig. 15. In order to avoid undue complication of the illustration, I have shown only fuel lines associated with the right-hand cell in Fig. 15; only water lines associated with the intermediate cell; and only ignition lines associated with the left-hand cell in that figure; but it is to be understood that all three of these lines will lead from the above-mentioned manifold to each of the five cells of the cluster.

According to the arrangement selected for illustration, the injector banks 132 and 134 will pump fuel, while the injector banks 130 and 136 will pump water. Associated with the ports 65 of each of the cells in the cluster are adapter plates constructed to accommodate connections for supplying the combustion cells, said plates comprising means for closing the port holes 65 against the atmosphere. Thus, such adapter plates 138, 139, 140, and 141 are shown associated with the right-hand cell in Fig. 15.

The pipe 133 is split as it leaves the manifold into branches 133' and 133'' which are led, respectively, to the connection 142 of the adapter plate 138 and the connection 143 of the adapter plate 139. Similarly, the pipe 135 is split as it leaves the manifold into branches 135' and 135'' connected, respectively, to the connection 144 of adapter plate 140 and the connection 145 of the adapter plate 141. Those connections, 142, 143, 144, and 145 may support spray nozzles, so that, by the means above described, fuel will be intermittently sprayed under pressure into the inner cell of the chamber illustrated at the right in Fig. 15, through the four port holes 65 and through the conduits 83, as those conduits come into registry with the port holes 65.

Although it is not illustrated, it will be understood that the pipes 133a, 133b, 133c, 133d, and the pipes 135a, 135b, 135c, and 135d are similarly branched for similar connection to the corresponding nozzles of the adapter plates of the other four combustion chambers, so that fuel is supplied through four nozzles to each of the combustion chambers in turn.

Metered quantities of water are likewise fed to the interior of each of the combustion chambers. Thus, the pipe 131, as it leaves the manifold, is split into four branches 131', 131'', 131''', and 131$^{iv}$, which branches are connected respectively to connections 150, 151, 152, and 153 of the adapter plates 146, 147, 148, and 149. The said connections may preferably be provided with spray nozzles; and it will be understood that the pipes 131a, 131b, 131c, and 131d are similarly branched to supply water in a similar fashion to the other four cells of the cluster.

I believe it to be desirable also to supply water independently to the lower portion of each of the combustion chambers. I have therefore provided each of the outer cells 54 with a plurality of ports 154 (see Fig. 9) adjacent its base, these ports being in peripheral registry with the ports 63 in the base of the cell. As will be apparent from an inspection of Fig. 6, the ports 69 in the base of each inner cell extend beyond the periphery of the cell base and up into the cylindrical portion of the cell. When the inner cells are assembled with the outer cells, these upward projections of the ports 69 extend into the horizontal plane occupied by the inner ends of the ports 154 of the outer cell, thereby providing intermittent communication between the ports 154 and the interior of the combustion chamber as the inner cell is rotated.

Water is supplied to the ports 154 by the injector bank 136. The pipe 137 is split into branches 137', 137'', 137''', and 137$^{iv}$, which branches cross the upper end of the chamber and are led down the sides thereof to the respective ports 154.

Preferably enclosed within the same manifold are the electrical leads 155, 155', 155'', and 155''' which lead to suitable igniting devices carried by the adapter plates, as at 156, 157, 158, and 159.

Figure 16:
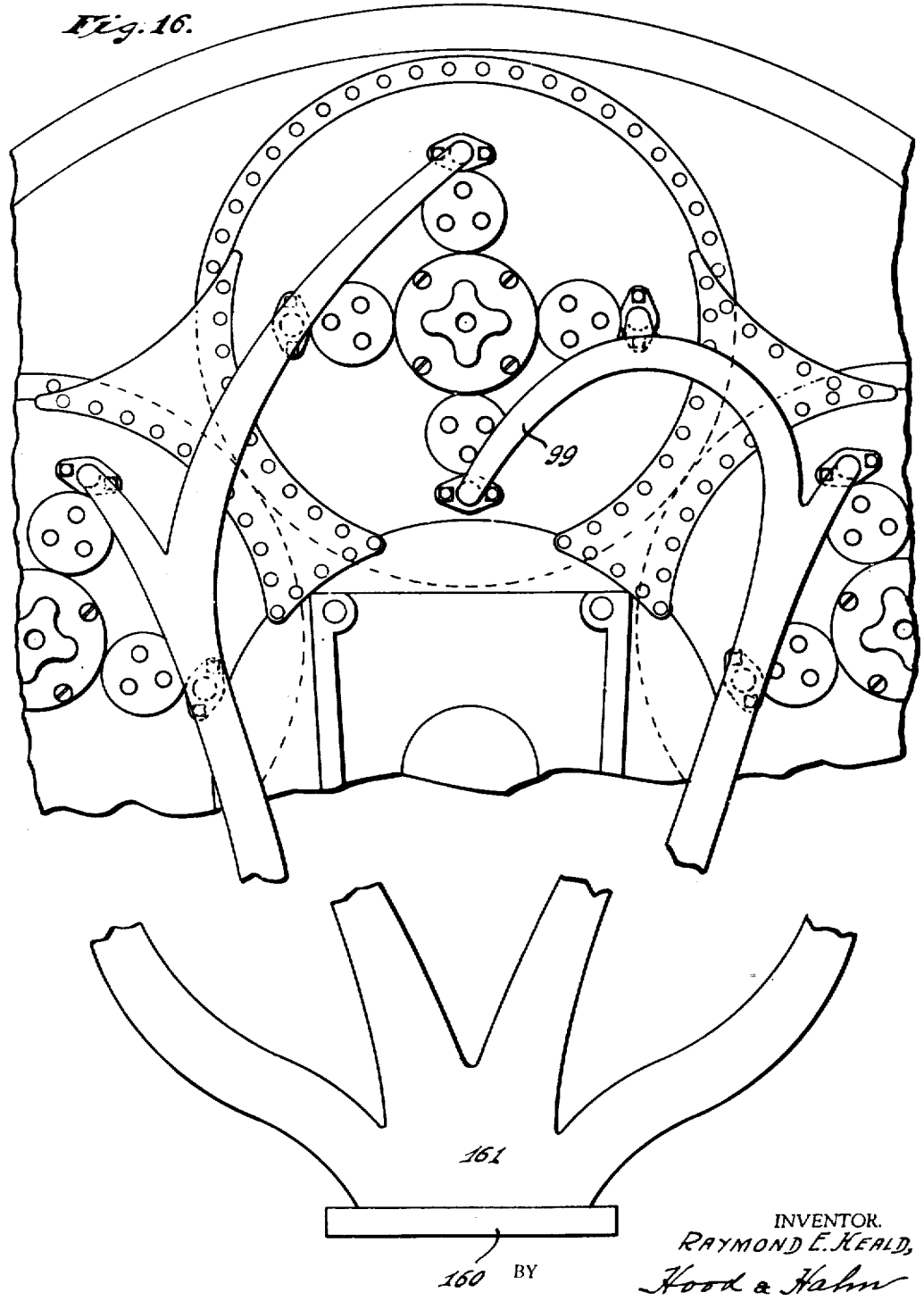
Fig. 16 is a similar view showing other supply lines.

The coolant for the combustion chambers is led from a suitable source of supply through a manifold such as 160 (see Fig. 16) having branches 161 which terminate in the conduits 99 (see Figs. 16 and 11).

Associated with the cell cluster is a hood 162 secured to a suitably formed block 170 to define a chamber 171 from which leads the high pressure supply line 168. A collector box 166 is mounted within the chamber 171, but has no communication therewith, said collector box having a plurality of collector tubes 165, each of which terminates in a spider 163 having four arms 164. The arms 164 of the spiders 163 are mounted in registry with the ports 64 of the outer cells, so that said spiders 163 and tubes 165 lead the low pressure products of combustion to the collector box 166, whence such gases are led through the low pressure supply line 167. It will be clear from an inspection of Figs. 1 and 3 that the ports 63 and the passages 78 discharge directly into the high pressure collector chamber 171.

In Fig. 1, I have shown an oil pump 169 driven from the main shaft 20 for providing pressure in a suitable lubricating system, the details of which are not illustrated, since they form no part of the present invention.

Suitable means, such as an electric motor adapted to be energized either from an external source or from a generator driven by the turbine which is supplied by the present combustion system, is provided for driving the main shaft 20. As said shaft is rotated, the fan 21 will be rotated at a higher speed to supply air under pressure to the chambers 61 of the various cells of the cluster. The gear 44 will likewise be driven and, through its mesh with the gears 88 of the various inner cells, will cause continuous rotation of those inner cells. The operation of all of the combustion chambers will be the same, although the cycles thereof will be so timed that there will always be at least one chamber discharging gases into the high pressure receiver 171 and at least one chamber discharging gases into the low pressure receiver 166.

In each such chamber, as the inner cell rotates, the following cycle will occur. The ports 69 begin to register with the ports 64 just before the ports 68 come into registry with the ports 62. Air under pressure, supplied from the fan 21 and standing in the chamber 61, rushes through the ports 62 and 68 to scavenge the combustion chamber, flowing out through the ports 64 and the branches 164 of the spider 163 to the low pressure receiver 166, and thence through the conduit 167. As the inner cell continues to rotate, the ports 69 close the ports 64 and thereafter the ports 68 close the ports 62, whereby the chamber is left full of air under pressure.

Now the ports 69 begin to move into registry with the ports 63, and the conduits 83 open the interior of the inner cell to the port holes 65 and the connections associated therewith. Fuel injection begins, against the air pressure existing within the combustion chamber, and the fuel is ignited as it begins to flow into the combustion chamber. Water injection through the branches of the pipe 131 will begin at some time after fuel ignition. The combustion of the fuel will result in an enormous increase in pressure in the chamber and in a rapid rise of temperature, which temperature rise is retarded by the injection of water which, because of the high temperature, will be converted into steam which will join the stream of products of combustion flowing through the ports 63 into the high pressure receiver 171 and thence through the conduit 168. The ports 154 will likewise be opened to permit a flow of water into the combustion chamber through the branches of the pipe 137. If and when the temperature within the combustion chamber rises to a value, relative to the pressure existing in the receiver 171, such as to move the valve 123 to bring its ports 124 into registry with the passage 73, water from the cooling system will also be injected into the receiver 171 as high pressure steam.

At a suitable instant after fuel injection is terminated, the ports 69 will move out of registry with the ports 63, thus entrapping gases under high pressure within the chamber.

Now, the ports 69 move again into registry with the ports 64 to relieve that high pressure just before the ports 62 are opened by the ports 68 to admit air under pressure to scavenge the burned gases from the chamber.

It will be seen that these two steps complete one cycle of the combustion system, and that four such cycles occur during each rotation of the inner cell.

I claim as my invention:

1. A combustion system comprising a stationary outer cell, a cell mounted for rotation within said stationary cell, said outer cell being formed to provide an even number of outlet ports arranged in an annular series, said inner cell being formed to provide one-half as many outlet ports adapted to move into and out of registry with said outer cell outlet ports as said inner cell rotates, a high pressure receiver, a low pressure receiver, one-half said outer cell outlet ports being arranged to discharge into said high pressure receiver and the other half thereof being arranged to discharge into said low pressure receiver, means for rotating said inner cell, and means, including separate inlet ports in said inner and outer cells, for intermittently injecting a mixture of fuel and air into said inner cell and there igniting such mixture.

2. A combustion system comprising a stationary outer cell, a cell mounted for rotation within said stationary cell, said outer cell being formed to provide an even number of outlet ports arranged in an annular series, said inner cell being formed to provide one-half as many outlet ports adapted to move into and out of registry with said outer cell outlet ports as said inner cell rotates, a high pressure receiver, a low pressure receiver, one-half said outer cell outlet ports being arranged to discharge into said high pressure receiver and the other half thereof being arranged to discharge into said low pressure receiver, means for rotating said inner cell, means for supplying air under pressure to a collecting chamber associated with said outer cell, said outer cell being provided with an annular series of inlet ports communicating with said collecting chamber, said inner cell being provided with at least one inlet port in addition to its said outlet ports and movable, upon rotation of said inner cell, into and out of registry with said outer chamber inlet ports, means for injecting fuel into said inner cell as said inner cell inlet port moves out of registry with an outer cell inlet port, and means for igniting such fuel as it flows into said cell.

3. For use in a combustion system, a substantially cylindrical cell providing a single combustion chamber having a plurality of peripherally-spaced inlet ports adjacent one end for the admission of fuel and scavenging fluid thereto and a plurality of peripherally-spaced outlet ports at its opposite end for the expulsion of the products of combustion, said cell further being formed to provide an independent chamber at its first-named end having a plurality of inlet ports for the admission of a fluid coolant thereto, a plurality of ports opening from said independent chamber through the peripheral wall thereof, and a plurality of axially-extending grooves, one for each of said last-named ports, formed in the peripheral surface of said cell, said last-named ports providing a means of communication from said independent chamber to said axially-extending grooves.

4. For use in a combustion system, the combination with a substantially cylindrical cell providing a combustion chamber having a plurality of peripherally-spaced inlet ports adjacent one end for the admission of fuel and scavenging fuel thereto and a plurality of peripherally-spaced outlet ports at its opposite end for the expulsion of the products of combustion, said cell further being formed to provide an independent chamber at its first-named end having a plurality of inlet ports for the admission of a fluid coolant thereto, a plurality of ports opening from said independent chamber through the peripheral wall thereof, and a plurality of axially-extending grooves, one for each of said last-named ports, formed in the peripheral surface of said cell, of a cylindrical shell externally sleeved on said cell, and closely engaging the peripheral surface thereof to convert each of said grooves into a steam-tight passage, said shell being formed with ports registering with said inlet ports of said cell.

5. For use in a combustion system, the combination with a substantially cylindrical cell providing a combustion chamber having a plurality of peripherally-spaced inlet ports adjacent one end for the admission of fuel and scavenging fluid thereto and a plurality of peripherally-spaced outlet ports at its opposite end for the expulsion of the products of combustion, said cell further being formed to provide an independent chamber at its first-named end having a plurality of inlet ports for the admission of a fluid coolant thereto, a plurality of ports opening from said independent chamber through the peripheral wall thereof, and a plurality of axially-extending grooves, one for each of said last-named ports, formed in the peripheral surface of said cell, of a cylindrical shell externally sleeved on said cell, and closely engaging the peripheral surface thereof to convert each of said grooves into a steam-tight passage, said shell being formed with ports registering with said inlet ports of said cell, and an external gear fixed to said shell intermediate its ends.

6. For use in a combustion system, a substantially cylindrical cell having axially-projecting hubs at its opposite ends, said cell being formed to provide a combustion chamber and to provide further an independent chamber at one end of said cell, the hub at said one end of said cell being formed with a bore communicating with said independent chamber, to provide for the admission of a fluid coolant thereto, a plurality of ports opening from said independent chamber through the peripheral wall thereof, a plurality of axially-extending grooves, one for each of said last-named ports, formed in the peripheral surface of said cell, said last-named ports providing a means of communication from said independent chamber to said axially-extending grooves, the wall at the other end of said cell being hollow and terminating, at the periphery of said cell, in a shoulder projecting radially beyond said cell periphery, a plurality of ports opening into said hollow end wall, one from each of a number of said grooves, and the hub at said other end of said cell being formed with a bore, communicating with the hollow in said last-named wall, the passageways formed thereby providing a means for exhausting a fluid.

7. For use in a combustion system, a substantially cylindrical cell having axially-projecting hubs at its opposite ends, said cell being formed to provide a combustion chamber and to provide further an independent chamber at one end of said cell, the hub at said one end of said cell being formed with a bore communicating with said independent chamber, to provide for the admission of a fluid coolant thereto, a plurality of ports opening from said independent chamber through the peripheral wall thereof, a plurality of axially-extending grooves, one for each of said last-named ports, formed in the peripheral surface of said cell, said last-named ports providing a means of communication from said independent chamber to said axially-extending grooves, the wall at the other end of said cell being hollow and terminating, at the periphery of said cell, in a shoulder projecting radially beyond said cell periphery, a plurality of ports opening into said hollow end wall, one from each of a number of said grooves, and the hub at said other end of said cell being formed with a bore, communicating with the hollow in said last-named wall, the passageways being formed thereby providing a means for exhausting said coolant, and a shell externally sleeved on said cell closely engaging the peripheral surface thereof to convert said grooves into steam-tight passages connecting said independent chamber with said hollow end wall, and resting on said shoulder.

8. For use in a combustion system, a substantially cylindrical cell having axially-projecting hubs at its opposite ends, said cell being formed to provide a combustion chamber and to provide further an independent chamber at one end of said cell, the hub at said one end of said cell being formed with a bore communicating with said independent chamber, to provide for the admission of a fluid coolant thereto, a plurality of ports opening from said independent chamber through the peripheral wall thereof, a plurality of axially-extending grooves, one for each of said last-named ports, formed in the peripheral surface of said cell, said last-named ports providing a means of communication from said independent chamber to said axially-extending grooves, the wall at the other end of said cell being hollow and terminating, at the periphery of said cell, in a shoulder projecting radially beyond said cell periphery, a plurality of ports opening into said hollow end wall, one from each of a number of said grooves, and the hub at said other end of said cell being formed with a bore, communicating with the hollow in said last-named wall, the passageways being formed thereby providing a means for exhausting said coolant, a shell externally sleeved on said cell, closely engaging the peripheral surface thereof to convert said grooves into steam-tight passages connecting said independent chamber with said hollow end wall, and resting on said shoulder, and valve means controlling flow between the hollow in said end wall and the bore of said last-named hub.

9. For use in a combustion system, a substantially cylindrical cell having axially-projecting hubs at its opposite ends, said cell being formed to provide a combustion chamber and to provide further an independent chamber at one end of said cell, the hub at said one end of said cell being formed with a bore communicating with said independent chamber, to provide for the admission of a fluid coolant thereto, a plurality of ports opening from said independent chamber through the peripheral wall thereof, a plurality of axially-extending grooves, one for each of said last-named ports, formed in the peripheral surface of said cell, said last-named ports providing a means of communication from said independent chamber to said axially-extending grooves, the wall at the other end of said cell being hollow and terminating, at the periphery of said cell, in a shoulder projecting radially beyond said cell periphery, a plurality of ports opening into said hollow end wall, one from each of a number of said grooves, and the hub at said other end of said cell being formed with a bore, communicating with the hollow in said last-named wall, the passageways being formed thereby providing a means for exhausting said coolant, a shell externally sleeved on said cell, closely engaging the peripheral surface thereof to convert said grooves into steam-tight passages connecting said independent chamber with said hollow end wall, and resting on said shoulder, and valve means controlling flow between the hollow in said end wall and the bore of said last named hub, said valve means being movable under the influence of a temperature rise in said combustion chamber to open communication for such flow.

10. The structure recited in claim 6 in which said cell is further provided with a plurality of peripherally spaced inlet ports in its peripheral wall adjacent its first-named end, a plurality of peripherally-spaced inlet conduits in its first-named end, penetrating but not communicating with said independent chamber to provide a means for injecting fuel to said cell, and a plurality of exhaust ports in its hollow end wall penetrating but not communicating with the hollow in said wall.

11. The structure recited in claim 9 and including means for supplying a flow of coolant liquid continuously to the bore of said first-named hub.

12. The structure recited in claim 9 and including a continuously operating pump drawing a supply of liquid coolant from a source thereof and supplying the same under pressure to the bore of said first-named hub, and by-pass means responsive to pressure conditions in said bore for returning such liquid to the inlet side of such pump.

13. In a combustion system, an outer cell, an inner cell rotatably mounted in said outer cell and formed to provide a combustion chamber, means for intermittently charging said chamber with air under pressure, means for intermittently injecting liquid fuel into said chamber to mix with such charge of air, means for igniting such fuel as it flows into said chamber, a receiver, means for passing the products of such combustion under pressure into said receiver, and means for supplying a flow of coolant liquid between said inner and outer cells, said last-named means including valve means responsive to the ratio between current temperature within said combustion chamber and current pressure within said receiver.

14. A combustion system including a cluster of combustion units, each of said units including a combustion chamber, means for successively charging said chambers with air under pressure, means for injecting sprayed liquid fuel into each of said chambers after so charging the same, means for igniting such fuel as it flows into each of such units, a high pressure receiver, means for releasing the products of such combustion to said receiver, means for breaking communication between said receiver and each combustion chamber, a low pressure receiver, means for subsequently providing communication between each of said combustion chambers and said low pressure receiver, and means for supplying air under pressure to each of said combustion chambers while such communication is continued to scavenge such combustion chamber.

15. A combustion system including a cluster of combustion units, each of said units including a combustion chamber, means for successively charging said chambers with air under pressure, means for injecting sprayed liquid fuel into each of said chambers at a plurality of spaced points in such chamber after so charging the same, means for igniting such fuel as it flows into each of such units, means for injecting sprayed water into each of said chambers during combustion of such fuel therein, a high pressure receiver, means for releasing the products of such combustion to such receiver before the combustion of such fuel is completed, means for breaking communication between said receiver and each combustion chamber, a low pressure receiver, means for subsequently providing communication between each of said combustion chambers and said low pressure receiver, and means for supplying air under pressure to each of said combustion chambers while such communication is continued to scavenge such combustion chamber.

16. A combustion system including a cluster of combustion units, each of said units including a combustion chamber, means for successively charging said chambers with air under pressure, means for injecting sprayed liquid fuel into each of said chambers at a plurality of spaced points in such chamber after so charging the same, means for igniting such fuel as it flows into each of such units, means for injecting sprayed water into each of said chambers at a plurality of spaced points in such chamber during combustion of such fuel therein, a high pressure receiver, means for releasing the products of such combustion to said receiver before the combustion of such fuel is completed, means for breaking communication between said receiver and each combustion chamber, a low pressure receiver, means for subsequently providing communication between each of said combustion chambers and said low pressure receiver, and means for supplying air under pressure to each of said combustion chambers while such communication is continued to scavenge such combustion chamber.

17. In a combustion system, a combustion unit comprising a stationary outer cell, a generally cylindrical hollow inner cell formed to provide in its interior a combustion chamber and mounted for rotation within said stationary cell, a means for providing a source of air under pressure to said unit, a second means for providing a source of liquid fuel under pressure to said unit, a high pressure receiver, a low pressure receiver, means for rotating said inner cell, means providing an air inlet port in the inner periphery of said outer cell continuously communicating with said first means, a fuel inlet port in one end of said outer cell continuously communicating with said second means, a high pressure exhaust port in the other end of said outer cell continuously communicating with a high pressure receiver, and a low pressure exhaust port independent of said high pressure exhaust port and located in the same end of said outer cell continuously communicating with a low pressure receiver, an inlet opening extending from the periphery of said inner cell into said combustion chamber and movable, as said cell rotates, into and out of registry with said air inlet port, an outlet opening extending from the exterior of said inner cell adjacent said second-named end into said combustion chamber and angularly spaced from the position of said inlet opening to move, as said inner cell rotates, into and out of registry with said low pressure exhaust port just ahead of the registration of said inlet opening with said air inlet port, said outlet opening next moving, as cell rotation continues, into registry with said high pressure exhaust port, a fuel inlet opening leading from the exterior of said inner cell adjacent said first-named end into said combustion chamber and axially disposed opposite said outlet opening, said fuel inlet opening being movable, as said inner cell rotates, into registry with said fuel inlet port just after said outlet opening registers with said high pressure exhaust port and out of regstry with said fuel inlet port just before said outlet opening moves out of registry with said high pressure exhaust port, means in said inner cell for igniting fuel therein and means for energizing the igniting means as said fuel inlet opening registers with said fuel inlet port.

18. The structure recited in claim 17 including a source of liquid coolant under pressure, a coolant inlet port in said second-named end of said outer cell continuously communicating with said coolant source, said coolant inlet port being independent of and located near said high pressure exhaust port to register with said outlet opening when said exhaust port and said outlet opening come into registry, whereby coolant under pressure is forced into said combustion chamber during the combustion step after energization of said igniting means.

RAYMOND E. HEALD.

REFERENCES CITED

The following references are of record in the file of this patent:

UNITED STATES PATENTS

| Number | Name | Date |
| --- | --- | --- |
| 694,090 | Clayden | Feb. 25, 1902 |
| 1,988,456 | Lysholm | Jan. 22, 1935 |
| 2,074,602 | Wilstram | Mar. 23, 1937 |